US011282371B2

(12) United States Patent
Lindstrom

(10) Patent No.: US 11,282,371 B2
(45) Date of Patent: Mar. 22, 2022

(54) INSTALLATION OF HYGIENE EQUIPMENT

(71) Applicant: Essity Hygiene and Health Aktiebolag, Gothenburg (SE)

(72) Inventor: Hakan Lindstrom, Gothenburg (SE)

(73) Assignee: Essity Hygiene and Health Aktiebolag, Gothenburg (SE)

( * ) Notice: Subject to any disclaimer, the term of this patent is extended or adjusted under 35 U.S.C. 154(b) by 0 days.

(21) Appl. No.: 16/967,501

(22) PCT Filed: Feb. 8, 2018

(86) PCT No.: PCT/EP2018/053158
§ 371 (c)(1),
(2) Date: Aug. 5, 2020

(87) PCT Pub. No.: WO2019/154497
PCT Pub. Date: Aug. 15, 2019

(65) Prior Publication Data

US 2021/0217291 A1 Jul. 15, 2021

(51) Int. Cl.
*G06F 17/00* (2019.01)
*G08B 21/24* (2006.01)
*G08B 25/00* (2006.01)

(52) U.S. Cl.
CPC ......... *G08B 21/245* (2013.01); *G08B 25/003* (2013.01)

(58) Field of Classification Search
CPC .... G08B 21/245; G08B 25/003; G08B 21/24; H04W 4/38; G16H 40/20; G06F 19/327
See application file for complete search history.

(56) References Cited

U.S. PATENT DOCUMENTS

| | | | | |
|---|---|---|---|---|
| 10,607,471 B2 * | 3/2020 | Hood | G16H 40/20 | |
| 2010/0173581 A1 * | 7/2010 | Dolan | G07C 11/00 | 455/39 |
| 2012/0245729 A1 * | 9/2012 | Wegelin | G01F 15/068 | 700/231 |
| 2013/0342349 A1 * | 12/2013 | Cruz | G08B 21/245 | 340/573.1 |

(Continued)

FOREIGN PATENT DOCUMENTS

| | | |
|---|---|---|
| CN | 105389959 A | 3/2016 |
| CN | 106233351 A | 12/2016 |
| JP | 2008086024 A | 4/2008 |

OTHER PUBLICATIONS

European Patent Office, International Search Report and Written Opinion of the International Searching Authority, International Application No. PCT/EP2018/053158, dated Oct. 26, 2018 (13 pages).

(Continued)

*Primary Examiner* — An T Nguyen
(74) *Attorney, Agent, or Firm* — Wood Herron & Evans LLP

(57) ABSTRACT

A piece of hygiene equipment arranged to dispense or dispose of a consumable to or from a user comprising a detector arranged to detect an observable from a surrounding of the piece of hygiene equipment and to provide a corresponding detector output and a processing unit arranged to receive the detector output, to process the detector output, and to generate information for determining a location of said piece of hygiene equipment.

20 Claims, 4 Drawing Sheets

(56) References Cited

U.S. PATENT DOCUMENTS

| | | | | |
|---|---|---|---|---|
| 2016/0140831 | A1* | 5/2016 | Hermann | G08B 21/245 340/573.1 |
| 2016/0148498 | A1* | 5/2016 | Ruszala | G06F 3/04842 340/506 |
| 2016/0283443 | A1* | 9/2016 | Michalscheck | F16K 35/00 |
| 2019/0147731 | A1* | 5/2019 | Herdt | G08B 21/24 340/573.1 |
| 2020/0302774 | A1* | 9/2020 | Eriksson | G08B 21/245 |
| 2020/0302775 | A1* | 9/2020 | Liu | G06K 7/10366 |
| 2021/0217291 | A1* | 7/2021 | Lindstrom | G08B 25/003 |

OTHER PUBLICATIONS

IP Australia, Examination report No. 1 for standard patent application, Application No. 2018408306, dated Oct. 30, 2020 (4 pages).

Federal Service for Intellectual Property (Russia), Office Action, Application No. 2020127965/28 (049646), dated Dec. 14, 2020 (9 pages).

Canadian Intellectual Property Office, First Examination Report, Application No. 3,090,731, dated Sep. 15, 2021 (4 pages).

National Intellectual Property Administration (CNIPA) of the People's Republic of China, Office Action, Application No. 201880088626.9, dated Apr. 26, 2021 (15 pages).

* cited by examiner

Fig. 1A
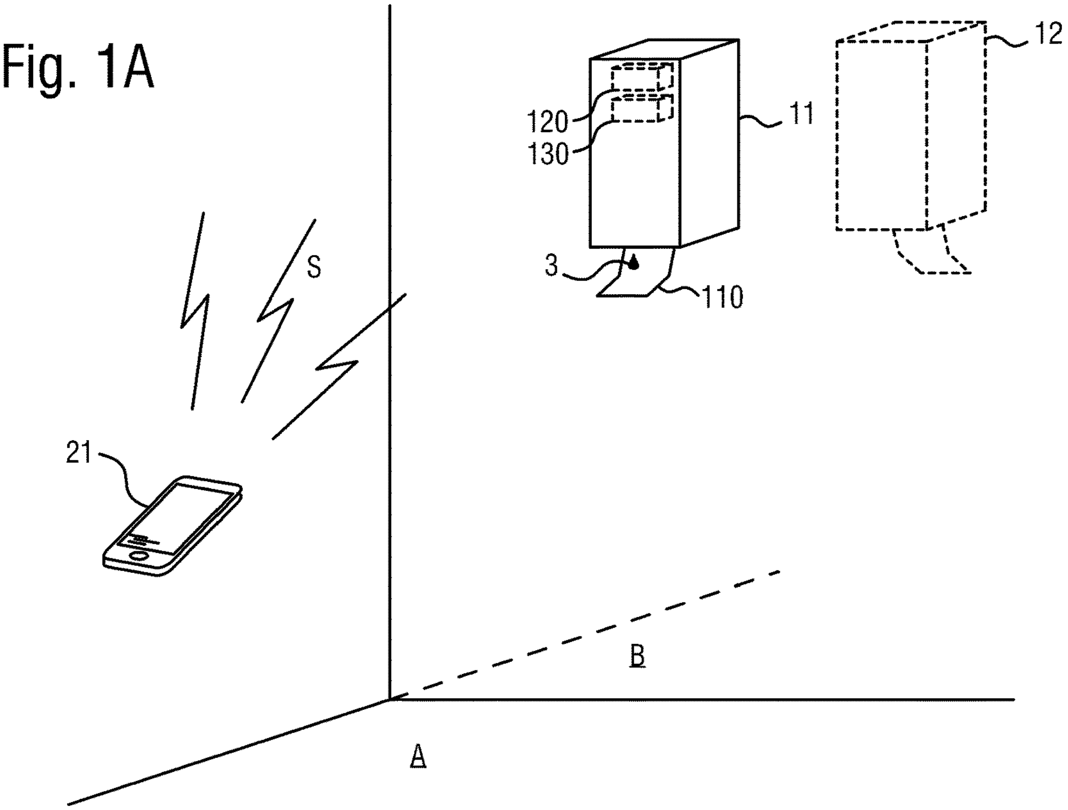
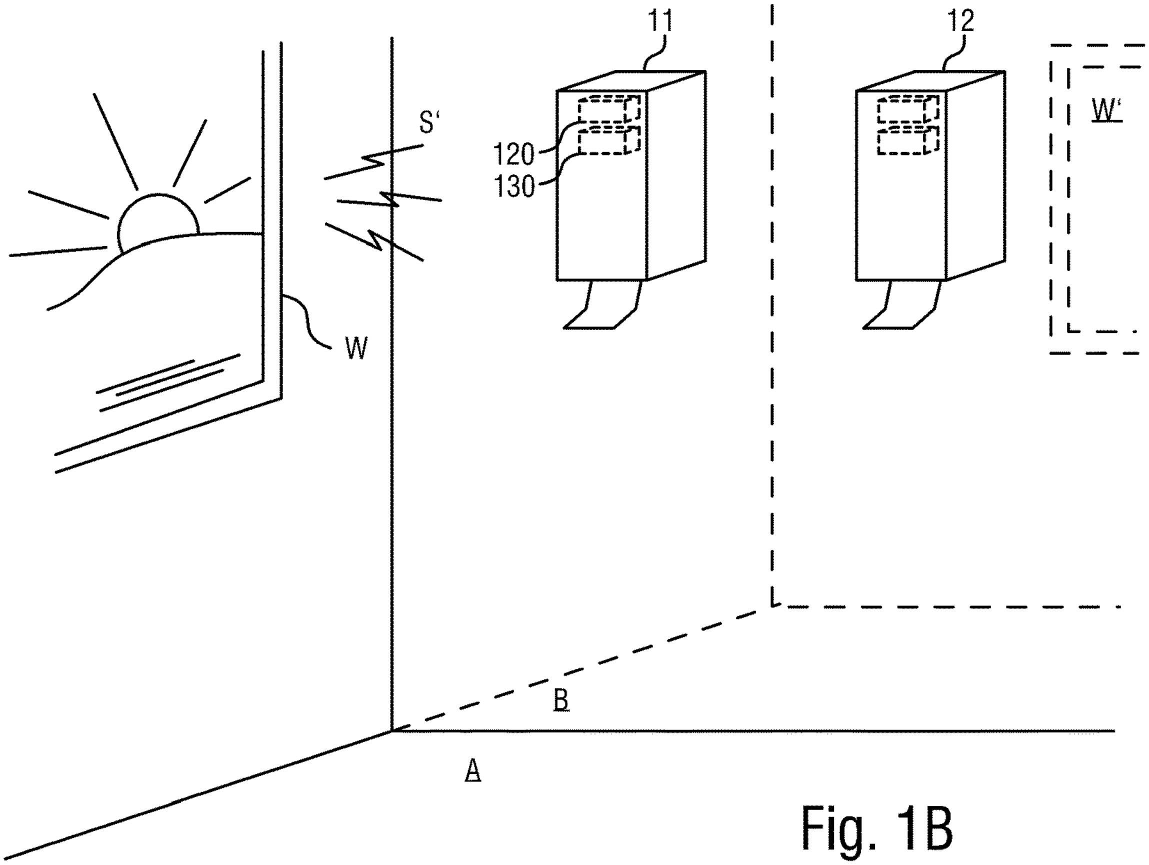
Fig. 1B

Fig. 5
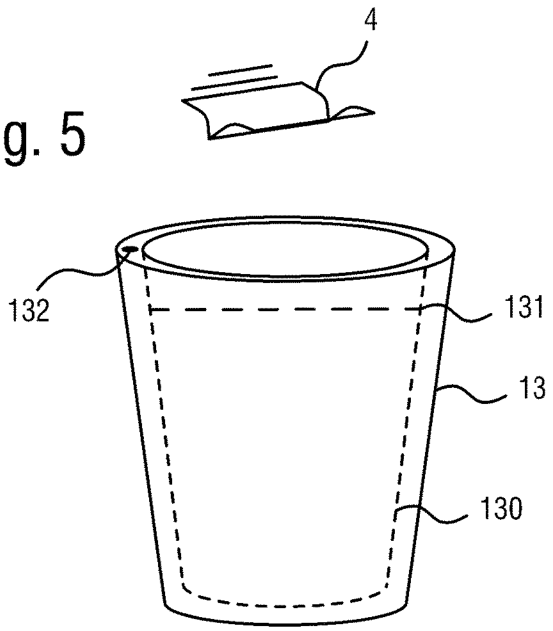
Fig. 6
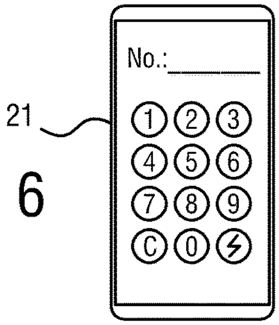
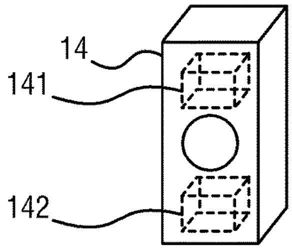
Fig. 8
Fig. 7A
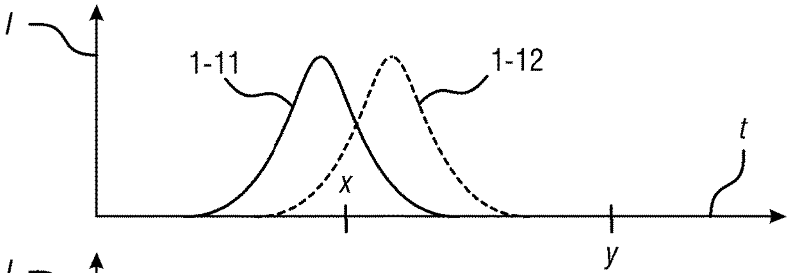
Fig. 7B
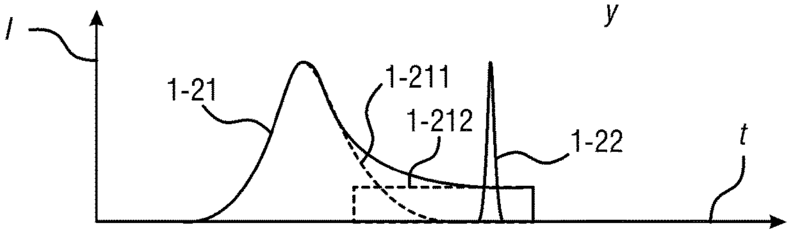
Fig. 7C
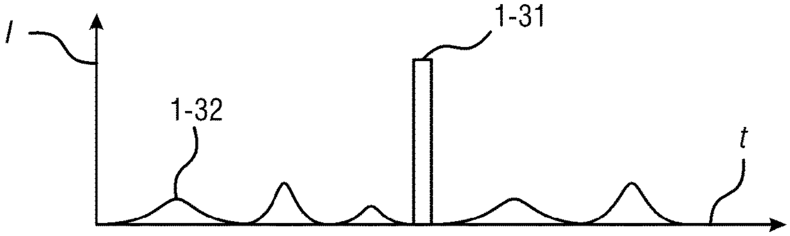
Fig. 7D
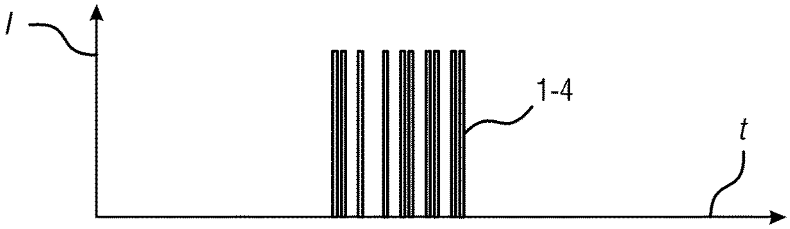

INSTALLATION OF HYGIENE EQUIPMENT

CROSS-REFERENCE TO RELATED APPLICATION

The present application is a national stage entry under 35 U.S.C. § 371 of, and claims priority to, International Application No. PCT/EP2018/053158, filed Feb. 8, 2018, the disclosure of which is hereby incorporated herein by reference in its entirety.

FIELD OF THE INVENTION

The present invention relates to the installation of hygiene equipment. More specifically, the present invention relates to a piece of hygiene equipment that is arranged to dispense a consumable to a user, and/or to dispose a consumable from a user, and can be associated to a location during or after an installation procedure.

BACKGROUND OF THE INVENTION

Hygiene equipment in the form of, for example, dispensers for various liquids and/or tissues, is generally common today in premises that are frequented by many people. Specifically, such premises can be office buildings, manufacturing sites, hospitals, airports, train stations, bus terminals, shopping malls, hotels, restaurants, schools, kindergartens, and the like, which all have in common that they are places being visited by a considerable number of people and that hand or body hygiene or cleaning in general is desired at least to some degree. As a consequence, these premises will provide restroom or related facilities for the people working or staying in these premises.

In such facilities, the described hygiene equipment may be installed in form of soap, foam or towel dispensers, disinfectant (e.g., alcogel, etc.) dispensers, air fresheners, toilet paper dispensers, hygiene bag dispensers, dispensers for hygiene products, such as absorbent articles, diapers, incontinence products, and other related devices. Usually, such hygiene equipment is predominantly present in restroom or toilet facilities. Likewise, such equipment may be found in entrance halls, kitchens, kitchenettes, offices, restaurants, canteens, conference/meeting rooms, receptions, reception areas, elevator, waiting areas, printer rooms and docucenters, gyms, or disposal areas. In the case of a hospital, for example, hygiene equipment will be present virtually everywhere, since doctors and caring personnel will need access to such facilities also when not using a restroom or toilet facility. Specifically, there may be rules and schemes that prescribe the use of hygiene equipment whenever entering some dedicated area, when approaching a patient, or, generally, before carrying out any tasks that require respective hygiene.

It is known in the arts to provide hygiene equipment in the form of dispensers having sensors which can detect that a given supply is about to run out or has run empty. Alternatively or in addition to this, there can be also sensors that detect a use instance, for example, when a user has dispensed an amount of disinfectant or has disposed of a used towel. The result of such detection can be made visible on the dispenser so that, for example, service personnel can take notice of a necessity to refill the dispenser. Likewise, it is known to provide such hygiene equipment with electronic capabilities for not only detecting the necessity of a refill or a use, but also for conveying information on related events to a somewhat central location.

For example, a server of, or, connected to a data network (e.g., Internet) can receive and store such notifications in order for allowing service personnel to receive or obtain corresponding indications that a refill needs to be carried out. Likewise, it is possible by means of respective use notifications to centrally observe and assess the actual use of the hygiene equipment in the field for, e.g., considerations on compliance. In such cases the hygiene equipment may have capabilities to convey signals related to the mentioned notifications via, for example, a wireless radio signal to a recipient station placed sufficiently near to the hygiene equipment.

It is furthermore common that in the above described use cases of hospitals and the like there will be oftentimes a considerable number of individual pieces of hygiene equipment. Specifically, a hospital, airport, or a hotel will have a considerable number of rooms and associated restrooms, and, consequently, the number of individual pieces of hygiene equipment will oftentimes reach tenths, hundreds, or even thousands. At the same time, however, the hygiene equipment should employ its sensing and communication capabilities in a sensible manner so that—amongst others—each individual piece of hygiene equipment can detect that its supply of consumable runs empty and can report the corresponding need for a refill to some kind of central entity, which, in turn, can schedule a refill by sending personnel to the desired location. In other words, one will need to know what to bring where in order to fulfil the refill request, or one wants to know what particular dispenser has been used at a given instance.

At this time it becomes clear that there should be some knowledge on where a piece of hygiene equipment is installed and what identification it has or of what type it is, so that any data received from the field can be associated to the correct piece of hygiene equipment. Although the prior arts provide for hygiene equipment that is able to (wirelessly) report the need of a refill and its respective identification information, the information on configuring the installation, including but not limited to naming each dispenser, define, describe and assign a location to each dispenser and setting up manageable and logical structures within software, still needs to be obtained by tedious manual configuration with so far only limited support from automated systems. These deficits in the prior art become perhaps most imminent when the number of individual pieces of hygiene equipment becomes large, e.g., reaches or is above one hundred.

One aspect of the present invention is therefore to provide a solution that can substantially facilitate the setting up and installation of hygiene equipment, even when the number of individual pieces to be installed becomes large. In some sense, it is a further aspect of the present invention to provide a piece of hygiene equipment that is capable to locate itself even within a group of neighboring pieces of hygiene equipment and to obtain and/or convey to a desired entity, e.g., a central server, such related information.

SUMMARY OF THE INVENTION

According to an embodiment of the present invention, there is provided a piece of hygiene equipment arranged to dispense or dispose of a consumable to or from a user comprising a detector arranged to detect an observable from a surrounding of the piece of hygiene equipment and to provide a corresponding detector output and a processing unit arranged to receive the detector output, to process the detector output, and to generate information for determining a location of said piece of hygiene equipment.

According to another embodiment of the present invention, there is provided a method of operating a piece of hygiene equipment arranged to dispense or dispose of a consumable to or from a user and comprising a detector and a processing unit, the method comprising the steps of detecting with the detector an observable from a surrounding of the piece of hygiene equipment and to providing a corresponding detector output; receiving at the processing unit the detector output; processing at the processing unit the detector output; and generating at the processing unit information for determining a location of said piece of hygiene equipment.

According to another embodiment of the present invention, there is provided a system comprising a piece of hygiene equipment and an entity being arranged to receive information from the piece of hygiene equipment over one or more networks, the entity comprising or having access to processing resources arranged to determine said location.

BRIEF DESCRIPTION OF THE DRAWINGS

Embodiments of the present invention, which are presented for better understanding the inventive concepts and which are not to be seen as limiting the invention, will now be described with reference to the figures in which:

FIG. 1A shows a schematic view of a piece of hygiene equipment according to an embodiment of the present invention;

FIG. 1B shows a schematic view of a piece of hygiene equipment according to another embodiment of the present invention;

FIG. 5 shows a schematic view of a piece of hygiene equipment that is arranged to dispose of a consumable from a user according to another embodiment of the present invention;

FIG. 6 shows a schematic view of a device arranged to emit a signal that can be detected by a piece of hygiene equipment according to another embodiment of the present invention;

FIGS. 7A to 7D show schematic views of patterns and behavior pattern of an observable according to further embodiments of the present invention; and FIG. 8 shows a schematic view of a device in the form of an exemplary door passing sensor according to another embodiment of the present invention.

DETAILED DESCRIPTION OF THE INVENTION

Figure 2A:
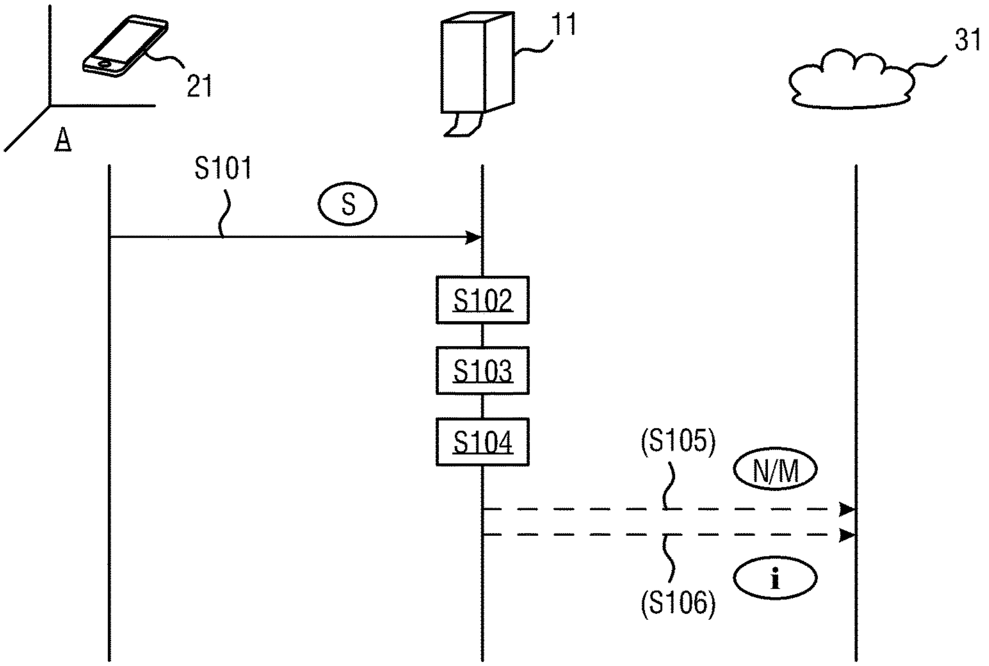
FIGS. 2A to 2C show schematic diagrams for depicting the detection, processing, and generation of information according to another embodiment of the present invention.

FIG. 1A shows a schematic view of a piece of hygiene equipment according to an embodiment of the present invention. Specifically, the figure shows a piece of hygiene equipment in the form of a soap, gel, foam, or liquid dispenser 11. As shown, the dispenser 11 is configured to dispense a consumable to a user in that, for example, a lever 110 is actuated for driving an ejection mechanism, which, in turn, ejects an amount 3 of the consumable held in a reservoir. The consumable may be accordingly liquid or solid soap, a disinfectant liquid/consumable, a foaming liquid, etc. As a consequence, a user's hand actuating the lever 110 can be provided with the amount 3 of soap, foam, or disinfectant. Although a liquid dispenser is shown, the following details may equally be combined with the respective components of a dispenser for solid substances, tissues, towels, absorbent articles, or other hygiene articles. Likewise, the embodiment may also apply to a piece of hygiene equipment that is arranged to dispose of a consumable from a user (e.g., a waste bin receiving a used towel from a user).

The piece of hygiene equipment (e.g., dispenser 11) is thus generally arranged to dispense or dispose of a consumable to or from a user and comprises a detector 120 which is arranged to detect an observable from a surrounding of the piece of hygiene equipment and to provide a corresponding detector output. The surrounding may be identified as room A where the dispenser 11 is installed and the mentioned observable can be any physical quantity that can be detected including observables such as light, radiation, heat, sound, audio, odor, smell, electromagnetic waves, vibration and the like. The piece 11 of hygiene equipment further comprises a processing unit 130 which is arranged to receive the detector output, to process the detector output, and to generate information for determining a location of said piece of hygiene equipment.

As an example, an originator of an observable signal may be present in room A in the form of a mobile device 21 (e.g., smartphone, portable computer device, or any other suitable device). This device 21 may act as an originator of a signal S (e.g., optical signal in the form of a light flash) that in turn can be detected as an observable by the detector 120 of the piece 11 of hygiene equipment. The detector output can be locally processed in the processing unit 130 so as to distinguish the received signal S from other input from the environment, such as ambient light. The signal for this purpose can have a specific intensity or modulation pattern that the processing unit can decode and identify. The signal may further carry in this way information on a room number or a position or location so that the dispenser 11 can determine and store the location locally and independently from any further entity.

In this embodiment it is employed the circumstance that the fact that the signal is received as such already implies information on the location. Specifically, a further piece of hygiene equipment (e.g., dispenser 12) may be present in an adjacent room B. However, only the dispenser 11 detects the signal S as the observable while dispenser 12 may—e.g., in the case of an optical signal S—not be able to receive the signal and thus may not assume to be in the same room A. The fact that dispenser 11 receives signal S however may tell the dispenser 11 that it is located in room A so that any further actions from the dispenser 11 may be associated to room A. For example, during regular use and operation, the dispenser 11 may detect a usage by a user and/or may detect that its reservoir of consumable runs empty. In this case a corresponding notification may be associated with the fact that dispenser 11 is located in room A, so that any higher level entities may send a refill to room A (and not room B) and/or associate the use to users present in room A (and not in room B).

In this way, a piece of hygiene equipment according to an embodiment of the present invention can generate information for determining a location of itself by detecting an observable from a surrounding of the piece of hygiene equipment. This configuration employs the circumstance that the location of the detector is related to the surrounding of the piece of hygiene equipment, and, in turn, the location of the surrounding is related to an originator of a signal that can be detected as an observable by the detector. If the location of the originator can be made known, one can derive information on a location of the piece of hygiene equipment. Further, this embodiment employs the circumstance that there exist kinds of barriers that at the same time define a location as well as a surrounding: For example, in the case of an optical signal (light, observable=light intensity and/or color), a wall may both define a room (in this case location) and the surrounding, so that a detector in another room cannot detect the observable as shown, e.g., in the context of dispenser 12 in FIG. 1A.

In general, a piece of hygiene equipment according to an embodiment of the present invention may comprise a reporting unit arranged to send messages and/or notifications toward a network and/or a computing, processing and/or data storage entity (e.g., a server computer). Related mechanisms are as such known, so the piece of hygiene equipment could be connected to a local network or the internet via ethernet, ethernet over power line, local area network, wireless local area network (WLAN, WiFi, etc.), general packet radio service (GPRS), universal mobile telecommunications system (UMTS), internet of things (IoT), 3GPP, 3G, 4G, 5G networks and the like. The related technologies provide established mechanism for transmitting data from a sender (i.e., here a piece of hygiene equipment) to a recipient (e.g., a server where, for example, the determination of the location takes place).

Such telecommunication infrastructure may also provide mechanisms for determining a location of a message or notification originator. For example, an identification of an access point, base station or other access node of the network or connection may be known. Corresponding data can thus also be considered when determining the location. This may specifically involve information that indicates a location of where a message/notification from a piece of hygiene equipment and/or from a mobile phone has been sent.

FIG. 1B shows a schematic view of a piece of hygiene equipment according to another embodiment of the present invention. As far as the dispensing and/or disposing properties and functionalities are concerned it is noted that the said in the above likewise can apply to the dispensers 11 and 12 as shown in FIG. 1B. Further, these dispensers 11 and 12 comprise a detector 120 arranged to detect the observable and a processing unit 130 arranged to receive the detector output, to process the detector output, and to generate information for determining the location.

In this embodiment the originator of the observable is casual in the sense that the circumstance is employed that the environment as such, including nature, everyday life, operation of equipment, living, etc., also generate and emit signals that can be detected as an observable. In this embodiment it is shown the example of the sun's rays of light penetrating through windows W and W' into rooms A and B. These rays may be identified as a signal S' being detected as an observable by the detectors 130 of dispensers 11 and 12. The detector output can be processed and information can be generated for determining the location of dispenser 11 and 12. For example, light-intensity patterns over time can be processed and compared to some time line so as to identify a similarity of the patterns observed by dispenser 11 and 12. From this it can be determined that dispensers 11 and 12 are in the same room which already constitutes information on a location in the context of the present invention.

More specifically, the window Win adjacent room B may be installed in another orientation as compared to the window W in room A. Therefore, the sun's rays in room B may develop a different intensity pattern over time as compared to the sun's rays in room A. Any piece of hygiene equipment according to any embodiment of the present invention may thus detect the light intensity as the observable with a different pattern. In this way, it can be distinguished that some dispensers are located in room A, while others may be located in room B. Similarly, such sensor output may be processed for generating more absolute information on the location of the detectors (piece of hygiene equipment). Specifically, the sun's rays may be detected as observables and the detected patterns can be distinguished for different geographical orientations. For example, one can identify all the pieces of hygiene equipment that are installed in rooms facing one geographical orientation (e.g., East), whilst another group of pieces of hygiene equipment can be identified that are installed in rooms facing another geographical orientation (e.g., South).

Generally, in addition to light, the physical quantities that can be detected include also observables such as, visible light, infrared light, ultraviolet light, radiation, heat, sound, audio, ultrasound, infrasound, odor, smell, electromagnetic waves, vibration, gas concentrations, CO2-levels, temperature, air pressure, humidity, and the like. In this way, more than one observable can be detected and a group of related data sets can be processed for finding relationships and correlations so as to generate information on the location of some or all pieces of hygiene equipment in a system. For example, acoustic noise generated by a moving cleaning team (employing, e.g., a vacuum cleaner) can be detected and employed for further refining detected data relating to another observable. In combination a precise—or at least sufficiently precise for the corresponding application—picture can be obtained on what piece of hygiene equipment is located where. This, however, even without the need for generating specific and dedicated signals and also without any need for tedious manual configurations and set-up procedures as they are still employed in the conventional arts.

Therefore, the type of observable may vary and/or be chosen specifically for an environment. For example, optical signals can be used and it can be sufficient to define a "room" by curtains (e.g., privacy curtains around hospital beds) or screens (e.g., screens separating stalls in a public washroom). Likewise other types of signals and observables (e.g., audio signals) may have other characteristics and will thus penetrate through the above-mentioned exemplary curtains and/or screens. This may be used in combination so as an audio signal may be used to identify the entire washroom, including all stalls, and an optical signal will identify each stall separately. In general, an embodiment of the present invention also includes the observation of a plurality of observables and to employ these observables individually or combinations thereof at different stages of the generation of the information on the location of hygiene equipment.

FIG. 2A shows a schematic diagram for depicting the detection, processing, and generation of information according to another embodiment of the present invention. In a step S101 a signal is generated from a surrounding A by means, for example, a device 21. This signal S is detected as an observable by a detector of a piece 11 of hygiene equipment. In a step S102, the detector provides a corresponding detector output to a processing unit of the piece 11 of hygiene equipment. The processing unit receives the detector output and processes the detector output in step S103.

Such processing may comprise analogue-to-digital-conversion, thresholding, filtering, and the like. The main purpose of processing S103 may lie in that the detector output is identified as relevant for further processing and is thus discriminated from other received signals that may not be suitable for or subject to further processing in the context of determining the location of the piece 11 of hygiene equipment.

In a step S104 information is generated for determining a location of the piece of hygiene equipment. In the present embodiment this may also involve determining as such the location. For example, this can be achieved by retrieving payload data from the signal S which may have been imprinted on the signal by device 21. This payload data may directly or indirectly indicate the location of the piece of hygiene equipment that can detect the signal as an observable. A detailed example for such a solution is given below in conjunction with FIG. 6. In any way, the determined location can be stored locally for access during later operation of the piece of hygiene equipment (e.g., when sending a supply or use notification N/M toward a network 31 in optional step S105. As a further optional step S106, also the determined location can be carried as information i toward the network 31. This may be part of registering process, so that a central entity (server) can be made aware of successful installation and setup of the piece 11 of hygiene equipment in combination with already knowing the respective location so that any further information and messages received during operation from this piece of hygiene equipment can be accordingly processed and put into the correct context.

Figure 2B:
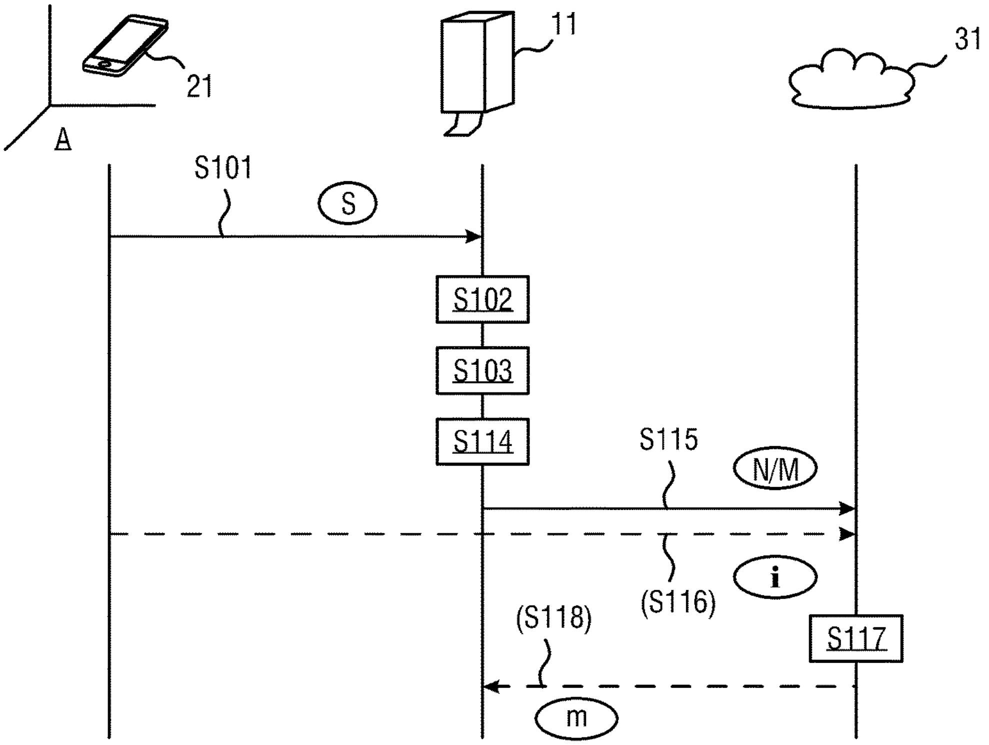

FIG. 2B shows a schematic diagram for depicting the detection, processing, and generation of information according to another embodiment of the present invention. The operation in steps S101 to S103 may be identical or similar as described above in conjunction with FIG. 2A. In step S114 information is generated for determining a location of the piece of hygiene equipment in the form of compiling a notification or message carrying information on the detected observable (e.g., measurement report, profile, log data, and the like). This notification or message N/M is then sent in step S115 toward a network 31. The latter (or an entity thereof such as a server) may directly or indirectly receive information i on a location of the surrounding or device 21 in an optional step S116. In this way, the network side can determine in step S117 the location of the piece 11 of hygiene equipment, which can be optionally reported back to the piece 11 of hygiene equipment in step S118.

In an example for the present embodiment, the signal S may originate from a smartphone 21 in the form of a light flash. The piece 11 of hygiene equipment detects this flash and reports it to a network side in step S115. When (or shortly before or thereafter), the smartphone 21 determines its location (e.g., via GPS, Galileo, GLONASS, indoor positioning systems employing any one of ranging, ultra wide band (UWB) ranging, Bluetooth™ and/or other applicable systems) and reports this location in step S116 also to the network. There can then be made a determination that there is a notification of a detected flash by a specific piece of hygiene equipment as well as a report of an emitted flash at a known location. Therefore, a determination can be made in step S117 that the specific piece 11 of hygiene equipment is located in room A where the device 21 has emitted the signal.

Figure 2C:
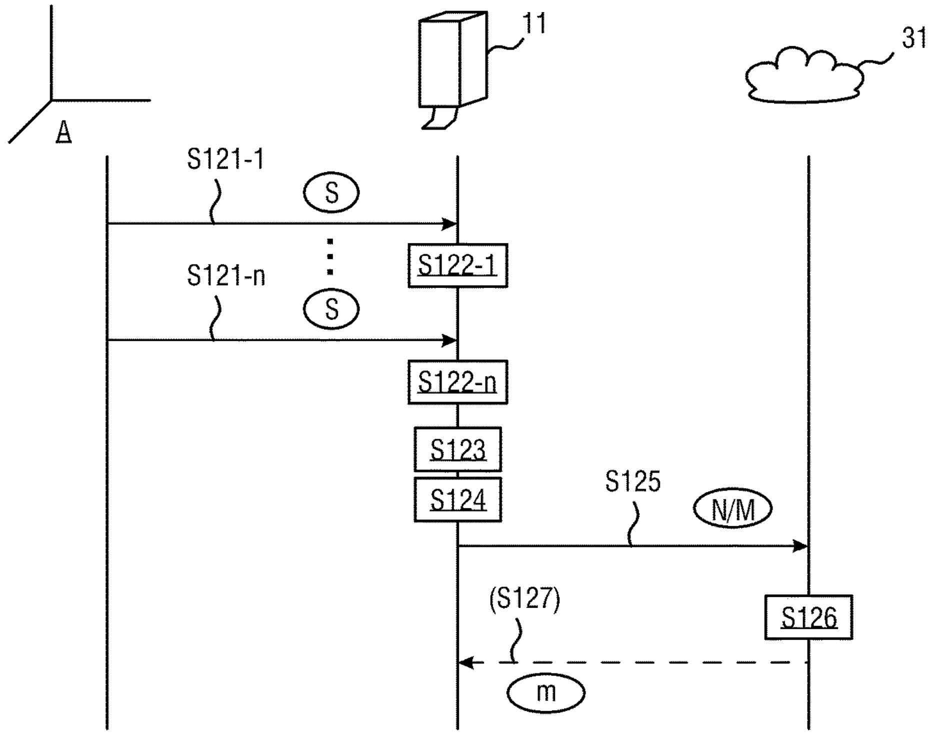

FIG. 2C shows a schematic diagram for depicting the detection, processing, and generation of information according to another embodiment of the present invention. This embodiment considers the determination of a location from observables that are available anyway in real-world implementations. Specifically, the piece of hygiene equipment 11 detects repeatedly an observable in steps S121-1 to S121-*n*. In corresponding steps S122-1 to S122-*n* the detector output is provided to and received by the processing unit of the piece 11 of hygiene equipment. The received output is processed in step S123 and information for determining a location of the piece 11 of hygiene equipment is generated in step S124. For example, a behavior profile of the detected observable is compiled that can be transmitted by means of a notification or message N/M in step S125 to a network side 31.

For example, an entity of or coupled to network 31 (e.g., a server) receives the notification or message N/M of step S125 and determines the location of the piece 11 of hygiene equipment in step S126. This may involve comparison or coincidence analysis possibly involving also data from other pieces of hygiene equipment. For example, sunlight, noise, time and other data may be processed as in the exemplary embodiment of FIG. 1B for eventually determining the location of one or more pieces of hygiene equipment in the field. As an option, the determined location may be notified to the corresponding piece 11 of hygiene equipment in step S127.

Generally therefore, a piece of hygiene equipment according to an embodiment of the present invention only needs to generate information for determining a location of the piece of hygiene equipment. That is, the determination of the location needs not to be performed locally in the piece of hygiene equipment but can be well performed centrally or at a remote location coupled to a network. This allows for a powerful approach to determine the location of individual devices from data collected from a plurality of devices, even for cases in which the determination of a location from data from one or just a few devices would be impossible or difficult. However, as explained above, the determination may also be performed locally if the available data permit, for example, when the received signal detected as the observable carries payload data indicating the location.

Further, the time, timings and time-span for detecting the observable may be chosen as appropriate. Specifically, the collection of real-life signals and the corresponding acquisition of data for determining the position may continue for days, weeks or even longer, meaning that generally the more info that is collected the better the precision of the determined location can be. Further, statistical methods and/or machine learning may be used to estimate the probability of a correct assignment of the equipment to rooms, or, more generally, the determined location.

In a further embodiment, the piece of hygiene equipment is arranged to detect one or more observable(s) at some given sequence (random, periodically, threshold triggered, etc.). In a first mode the one or more observables are detected similarly as described in conjunction with steps S121-1 to S121-*n* in FIG. 2C. However, at least the generating of information for determining a location is performed only in a second mode that may commence after the first mode. For example, the second mode can be triggered by the piece of hygiene equipment receiving a specific signal via the detector or any other receiving unit. Further, the piece of hygiene equipment can also comprise a manual switch, the operation of which initiates the second mode. In this way, a plurality of pieces of hygiene equipment may be installed in some premises (e.g., hospital) and they start detecting and recording the observable. Once the installation stage is completed one may initiate the second mode and the determination of the respective location may commence.

Figure 3:
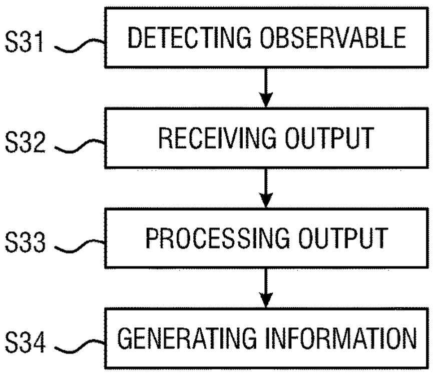
FIG. 3 shows a schematic flowchart of a general method embodiment of the present invention.

FIG. 3 shows a schematic flowchart of a general method embodiment of the present invention. Specifically there is provided a method of operating a piece of hygiene equipment arranged to dispense or dispose of a consumable to or from a user and comprising a detector and a processing unit. The method according to this embodiment comprises a step S31 of detecting with the detector an observable from a surrounding of the piece of hygiene equipment and to providing a corresponding detector output, a step S32 of receiving at the processing unit the detector output, a step S33 of processing at the processing unit the detector output, and a step S34 of generating at the processing unit information for determining a location of said piece of hygiene equipment.

Figure 4A:
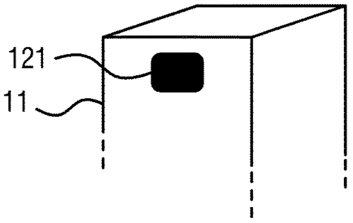
FIGS. 4A to 4C show schematic views of a section of a piece of hygiene equipment according to further embodiments of the present invention.
Figure 4B:
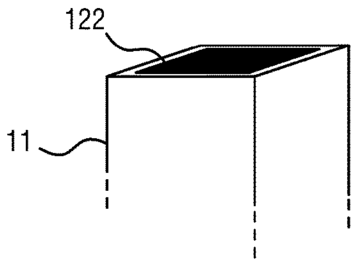
Figure 4C:
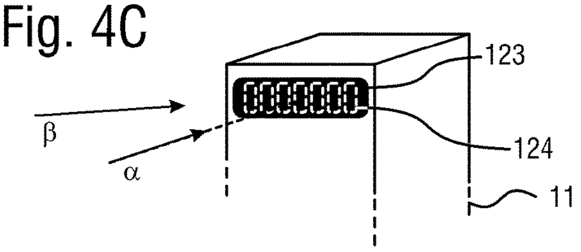

FIGS. 4A to 4C show schematic views of a section of a piece of hygiene equipment according to further embodiments of the present invention. Specifically, it is shown an upper section of a piece of hygiene equipment 11, e.g., a dispenser, where a window of a detector is located. A window can be rendered suitable for signals of various physical quantities to reach the detector, including optical signals (visible light, sunlight, illumination, light signals emitted from devices), acoustic signals (noise, speech, sound), smell signals (i.e., particles, smell carriers, gases, etc.) and others.

In FIG. 4A, a window 121 is located at a front face of the piece of hygiene equipment 11. In this way, optical or sound signals may be detected that originate from a surrounding in front of the piece 11 of hygiene equipment. In FIG. 4B, a window 122 is located at a top face of the piece of hygiene equipment 11. In this way, optical signals may be detected that may not need to originate from a surrounding directly in front of the piece 11 of hygiene equipment. Rather, also indirect light may be captured since the top window 122 may also collect light that is reflected by the wall or ceiling. In this way, environmental light originating also from outdoors (sun and moon-light) can be detected. Also, in case the window 122 is permeable, also smell carriers can sink onto the detector for the reason that many smells are conveyed by substances and particles heavier than air.

In FIG. 4C, a piece 11 of hygiene equipment is shown with a detector and a detector window 123 arranged to detect also a direction from which an observable is received. Preferably, the detector comprises a detector array including a plurality of detector elements 124, wherein each detector element 124 is associated to a range of directions. In this embodiment, the direction along which a physical quantity is incident to the piece of hygiene equipment can be detected and—if desired—reported. For example, a light ray may be incident at an angle $\alpha$, where it is predominantly detected by a center detector element, whereas another light ray may be incident at an angle $\beta$, where it is predominantly detected by an off-center detector element. In this way, further information on a location may be determined. Specifically, it can be, for example, distinguished at what wall a piece of hygiene equipment is mounted, so that individual pieces of hygiene equipment can be distinguished even if present in the same room.

FIG. 5 shows a schematic view of a piece of hygiene equipment that is arranged to dispose of a consumable from a user according to another embodiment of the present invention. Here, a piece 13 of hygiene equipment is shown in the form of a bin that is arranged to dispose a consumable from a user. For this purpose the bin 13 provides a reservoir 130 for receiving waste in the assumed predominant form of hygiene articles such as a used paper towel 4. If this bin 13 is, for example, placed in the vicinity of washbasin, the use of the bin, i.e., the disposal of towels or other items, may indicate a use of hygiene equipment. This use may be detected, for example, by means of a light barrier 131 that detects the passing of an item, e.g., a towel 4. Also, the light barrier 131 can be arranged to detect a state where the reservoir is full and the bin requires servicing so that it is emptied. As in the other embodiments, the piece 13 of hygiene equipment provides a detector 132 which is arranged to detect an observable and a processing unit as explained in conjunction with the present disclosure.

FIG. 6 shows a schematic view of a device arranged to emit a signal that can be detected by a piece of hygiene equipment according to another embodiment of the present invention. Specifically, the device 21 may be in the form of a smartphone, tablet computer or other suitable computer device 21. Preferably, however, the device 21 is programmable so that an application program (app) can be installed and executed. Such an app may present a keypad to a user who is prompted to enter an indicator to a location. For example, a user enters "021" as a room number (assuming the user is located in a room to which such room number was, is or will be assigned), and activates a flash button (ϟ).

In response to this, the device 21 generates a pattern that carries information indicating the room number and emits a signal (e.g., optical flash sequence) accordingly modulated. In this way, the emitted signal carries as payload information indicating the entered information. Subsequently, a piece of hygiene equipment according to an embodiment of the present invention detects the emitted light signal as an observable and processes the detector output. In this way, the payload can be decoded and the piece of hygiene equipment can gain knowledge about its location by retrieving the data indicating the room number. In the subsequent operation, the piece of hygiene equipment can report use events or needs for servicing in association to the location so that it can be known where servicing needs to be sent to and/or where a piece of hygiene equipment was actually used.

FIGS. 7A to 7D show schematic views of patterns and behavior patterns related to observables according to further embodiments of the present invention. Specifically, any observable may behave in some pattern over time or may be modulated in terms of intensity, amplitude, wavelength, color, and/or frequency. This modulation can be employed to provide a signal with payload data that can be detected and retrieved by the piece of hygiene equipment. Further, such properties can render it more reliable that any receiving/detecting device can distinguish a signal from any other phenomena that may be present in the real world (e.g., reflections of light, activations of infrared remote controls, and the like).

FIG. 7A shows a schematic view of an amplitude-versus-time-pattern of an observable. Specifically, the amplitude may represent a light intensity I detected by a detector of a piece of hygiene equipment and may follow the exemplary distribution 1-11. For example, the point in time x may represent noon (12:00) and the point in time y may represent some time in the evening, say 20:00. As the sun rises it may illuminate through a window a room in which the piece of hygiene equipment is located (cf., for example, dispenser 11 in room A in FIGS. 1A/B). The time of the year, geographical position and window orientation may be such that a light intensity is observed along amplitude 1-11 which features a maximum shortly before noon.

In comparison, another piece of hygiene equipment (cf., for example, a dispenser or other piece of hygiene equipment in room B in FIG. 1B) observes a light intensity along amplitude 1-12. Since, for example, a window of room B is orienteered in another geographical direction, the amplitude behavior may be similar but shifted in time. For example, if a window of room B in FIG. 1B is orienteered more to the west, the maximum of illumination by the sun may be later in time as compared to room A with a window facing south (assuming the premises being located on the northern hemisphere). In any way, from the detected observable a location can be determined at least with regard to some rooms or group of rooms that have windows with a specific orientation.

FIG. 7B shows a schematic view of an amplitude-versus-time-pattern according to another embodiment of the present invention. Specifically, there is shown a detected light intensity 1-21 that results from a superposition of sunlight illumination 1-211 and artificial light 1-212 switched on and off at some given times. This information can also be employed when determining the location of a detecting piece of hygiene equipment. In particular, the switching on and off times of illumination at a specific location may be well known from the building electricity distribution system which can be consulted for retrieving corresponding information on when and where, for example, illumination was switched on or off.

Further, the detector in this embodiment is arranged to detect at least one further observable with observed amplitude over time 1-22. For example, this could be observed sound or noise originating from a cleaning team (e.g., vacuum cleaner). If information on when the cleaning team was where (in what room) at what time, corresponding information can be employed when determining the location. Further, any two or more pieces of hygiene equipment detecting or experiencing a same or similar pattern of a respective observable (e.g., the above mentioned illumination or the just mentioned sound/noise) can determine that they are in the same room, for example. Generally, more than one observable can be detected, processed and employed when determining the location of a detecting piece of hygiene equipment.

FIG. 7C shows a schematic view of an amplitude-versus-time-pattern of an optical flash according to another embodiment of the present invention. Specifically, the amplitude takes the form of a specific pronounced spike 1-31 and can be thus distinguished from background 1-32 during processing the detector output. From the detector output characteristics such as intensity, time duration, rise time, falling time, etc., can be considered. In addition, further properties such as color, wavelength, etc., can be taken into account when processing the detector output. Further, a signal can be modulated in a periodic fashion in the sense of a well-defined frequency. This frequency can be filtered by processing for distinguishing the flash of light emitted from any other existent light, including light from electrical light sources carrying a mains frequency component or that of a lamp driving device. The frequency can be chosen in a way so as to maximize selectivity and can thus contribute in rendering the detection as a whole more reliable. Generally again, for any two or more pieces of hygiene equipment detecting or experiencing a same or similar pattern of a respective observable it can be determined that they are in the same room, for example.

FIG. 7D shows a schematic view of an intensity-versus-time-pattern of an optical signal according to another embodiment of the present invention. Specifically, the intensity I varies in a periodic fashion but here also information is modulated onto the otherwise monotonous carrier frequency with the result of a pulse sequence 1-4, in which information and payload data can be encoded by means of distinguishing between presence of a pulse and absence of a pulse. More specifically, a present pulse may correspond to binary "1", whereas a missing pulse may correspond to binary "0". In this or in a similar way, information can be carried by the signal, and, for example, convey information on any one of a location, room number, time-stamp, and the like. Any suitable protocol may apply that allows the coding of data into an intensity pattern.

According to a further embodiment there is provided a device comprising a detector arranged to detect an observable from a surrounding of the device and to provide a corresponding detector output and a processing unit arranged to receive the detector output, to process the detector output, and to generate information for determining a location of said device. The device may be configured in the same way as any piece of hygiene equipment as described in the present disclosure except for the fact that the device does not necessarily need to be arranged to dispense or dispose of a consumable to or from a user. The device may be, for example, any Internet-of Things (IoT) device or a door passing sensor as, e.g., the one shown in FIG. 8. This device 14 comprises a detector 141 arranged to detect an observable from a surrounding of the device and to provide a corresponding detector output and a processing unit 142 arranged to receive the detector output, to process the detector output, and to generate information for determining a location of said device.

According to further embodiments there are provided a method of operating a device comprising a detector and a processing unit, the method comprising the steps of detecting with the detector an observable from a surrounding of the device and to providing a corresponding detector output, receiving at the processing unit the detector output, processing at the processing unit the detector output, and generating at the processing unit information for determining a location of said device, and, respectively, a system comprising a device according to any applicable embodiment and an entity being arranged to receive information from the device over one or more networks, the entity comprising or having access to processing resources arranged to determine a location of the device.

Therefore, embodiments of the present invention can be applied and can be of help in the following situations: When installing many dispensers for hygiene equipment in a large facility it can be beneficial to connect them to a cleaning management system. This can be done via IoT connection of each individual device to a cloud (network) service. In the software it may be useful to organize the individual dispensers based on location, such as "this dispenser is located in room X". Today, this is done manually which oftentimes creates a resource bottleneck during large installations. A simple and cost efficient method to facilitate room allocation of dispensers would therefore be beneficial. In an embodiment a device or sensor can be thus equipped with a light sensor of some sort. The (dynamic) signal received from the sensor can be compared between sensors and if sufficient correlation is achieved it is deduced that the sensors are located in the same room.

In general one or more alternative operational options may be provided: In a "triggered" option, e.g., a flash of light (from, e.g., a (phone) camera flash or a dedicated IR-flash, can be fired in a room. Each dispenser that records/detects the flash—given a certain and narrow timeslot—can be considered to be in the same room. This methodology also allows the flash to be fired in a known room: "I will now fire the flash in room X, every dispenser that sees the flash is therefore located in room X". The specificity of such a flash can be increased if the signal clearly stands out from the ambient light, such as being of a specific wavelength (especially INFRA or ULTRA), or being modulated in the time-domain in some fashion. Also, in a "learning" option, the sensor/detector in the dispenser monitors light over a longer period of time, such as ambient light being turned on or off, the sun rising and setting through a window, etc. These patterns are compared between dispensers via, e.g., statistical methods, deep learning, AI or the like, until a sufficiently certain conclusion can be drawn that "these dispensers experience a similar/identical shift in recorded light patterns to draw the conclusion that they are in the same room". In contrast to the "triggered" option, the "learning" methodology hence does not require an active trigger from an operator, but rather set themselves up passively in the background over time. The room allocation, however, can be still done manually for each cluster of dispensers—preferably aided by the "triggered" methodology.

In general, light can be a source of data input. However, the principles described may work equally well with any of the below (including combinations of those and also other observables as mentioned in the context of the entire present disclosure): light (for example, also modulated in both time and/or frequency (ULTRA/visible/INFRA) domains for extra specificity (however, light generally does not propagate through walls, which means that a light signal is limited to a room which is why risk of triggering dispenser in the neighboring rooms is very limited), sound (similarly as with light, sound can also be modulated in the time and/or frequency (INFRA/Audible/ULTRA) domain for extra specificity (sound penetrates to a certain limited extent through walls (depending on frequency) which is why the corresponding specificity can be exploited in some applications and embodiments; however, this might in certain situations be seen as an advantage if a "room" consists of, e.g., opaque blinders separating several stalls within the same room. In these cases, sound may travel through the blinders in a way light may not), temperature and/or humidity may be suitable especially for the "learning" version of the invention, radio (which usually does penetrate through walls which limits the geography not to rooms but to "areas within radio range"), and others.

According to an embodiment, the following operation example can be obtained: before all dispensers can be configured under a "root" (building, gateway, etc.) to which they are located per default as they come online:

```
ROOT
  Dispenser1
  Dispenser2
  Dispenser3
  ...
  DispenserN
```

After the activation and carrying out an embodiment of the present invention, the dispensers can be allocated to certain rooms:

```
ROOT
  Room A
    Dispenser1
    Dispenser2
  Room B
    Dispenser3
    ...
  ...
    DispenserN
```

In a further option a "listen" mode can be implemented. During installation and configuration, all devices in the installation—including also, e.g., gateways and access points—may be set to a "listen" mode where they actively listen to a signal as described above. This may facilitate the setup although it may be preferred to do this initial setup via radio protocol to maximize coverage of one Gateway.

Although detailed embodiments have been described, these only serve to provide a better understanding of the invention defined by the independent claims, and are not to be seen as limiting.

What is claimed is:

1. A piece of hygiene equipment arranged to dispense or dispose of a consumable to or from a user, comprising:

a detector arranged to detect an observable from a surrounding of the piece of hygiene equipment and to provide a corresponding detector output; and a processing unit arranged to receive the detector output, to process the detector output, and to generate information for determining a location of said piece of hygiene equipment;

wherein said generating of information comprises determining a behavior pattern of said observable.

2. The piece of hygiene equipment according to claim 1, wherein the processing unit is further configured to determine information on the location of said piece of hygiene equipment.

3. The piece of hygiene equipment according to claim 1, wherein the processing unit is further configured to determine whether or not a notification to a network side is to be transmitted based on said processing the detector output and/or said generating of information.

4. The piece of hygiene equipment according to claim 3, further comprising a reporting unit arranged to generate and transmit toward a control entity said notification.

5. The piece of hygiene equipment according to claim 1, wherein the processing unit is configured to determine information on a location of said piece of hygiene equipment based on the determined behavior pattern of said observable and a behavior pattern of a further observable to be compared to as reference information.

6. The piece of hygiene equipment according to claim 5, further comprising a receiving unit arranged to receive a signal conveying said reference information.

7. The piece of hygiene equipment according to claim 1, wherein said generating of information comprises compiling a message carrying information that allows to determine the behavior pattern of said observable.

8. The piece of hygiene equipment according to claim 7, further comprising a reporting unit arranged to generate and transmit toward a control entity said message.

9. The piece of hygiene equipment according to claim 1, wherein the processing unit is configured to obtain a property profile of the detected observable and to derive information from the obtained property profile.

10. The piece of hygiene equipment according to claim 9, wherein the property is any one of an intensity, a modulation, and a wavelength of the observable.

11. The piece of hygiene equipment according to claim 9, wherein the processing unit is configured to derive information indicating a location and/or an identification of an originator of an observable signal from the obtained property profile.

12. The piece of hygiene equipment according to claim 11, wherein the processing unit is configured to derive location information for the piece of hygiene equipment from the information indicating a location and/or an identification of the originator.

13. The piece of hygiene equipment according to claim 1, further comprising a receiving unit arranged to receive location information for the piece of hygiene equipment in response to determining a location of said piece of hygiene equipment.

14. The piece of hygiene equipment according to claim 12, further comprising a memory unit providing an accommodation for the location information.

15. The piece of hygiene equipment according to claim 1, further comprising a sensor arranged to sense a usage event and a reporting unit arranged to generate and transmit toward a control entity a further notification in response to sensing the usage event.

16. The piece of hygiene equipment according to claim 14, wherein a reporting unit is arranged to access the location information and to include an indication to the location information into a further notification.

17. The piece of hygiene equipment according to claim 1, wherein the detector is arranged to detect a direction from which the observable is received.

18. The piece of hygiene equipment according to claim 17, wherein the detector comprises a detector array including a plurality of detector elements, each detector element being associated to a range of directions.

19. A method of operating a piece of hygiene equipment arranged to dispense or dispose of a consumable to or from a user and comprising a detector and a processing unit, the method comprising the steps of:

detecting with the detector an observable from a surrounding of the piece of hygiene equipment and to providing a corresponding detector output;

receiving at the processing unit the detector output;

processing at the processing unit the detector output; and generating at the processing unit information for determining a location of said piece of hygiene equipment by determining a behavior pattern of said observable.

20. A system comprising a piece of hygiene equipment according to claim 1 and an entity being arranged to receive information from the piece of hygiene equipment over one or more networks, the entity comprising or having access to processing resources arranged to determine said location.

* * * * *